(12) United States Patent
Ko

(10) Patent No.: US 10,613,259 B2
(45) Date of Patent: Apr. 7, 2020

(54) OPTICAL WAVELENGTH DISPERSION

(71) Applicant: Cheng-Hao Ko, Hsinchu County (TW)

(72) Inventor: Cheng-Hao Ko, Hsinchu County (TW)

(*) Notice: Subject to any disclaimer, the term of this patent is extended or adjusted under 35 U.S.C. 154(b) by 0 days.

(21) Appl. No.: 15/885,771

(22) Filed: Jan. 31, 2018

(65) Prior Publication Data
US 2019/0162883 A1 May 30, 2019

(30) Foreign Application Priority Data

Nov. 30, 2017 (CN) .......................... 2017 8 0017926

(51) Int. Cl.
*G02B 5/18* (2006.01)
*G02B 7/182* (2006.01)
*G01J 3/50* (2006.01)
*G01J 3/02* (2006.01)

(52) U.S. Cl.
CPC .......... *G02B 5/1814* (2013.01); *G02B 5/1857* (2013.01); *G02B 7/182* (2013.01); *G01J 3/0256* (2013.01); *G01J 3/502* (2013.01)

(58) Field of Classification Search
CPC .... G02B 5/1814; G02B 5/1857; G02B 7/182; G01J 3/0256; G01J 3/502
See application file for complete search history.

(56) References Cited

U.S. PATENT DOCUMENTS

2013/0114928 A1* 5/2013 Ko .......................... G03F 7/0005 385/37
2017/0102269 A1* 4/2017 Zhu ........................ G01J 3/1895

* cited by examiner

*Primary Examiner* — Wen Huang
(74) *Attorney, Agent, or Firm* — Raymond Y. Chan; David and Raymond Patent Firm

(57) ABSTRACT

An optical wavelength dispersion device is disclosed, which includes a waveguide unit and an adjustable reflecting unit, wherein the waveguide unit has a first substrate, an input unit, a grating, a reflector and a second substrate. The input unit is formed on the first substrate and having a slit for receiving an optical signal, a grating is formed on the first substrate for producing an output beam once the optical signal is dispersed, the reflector is formed on the first substrate for reflecting the output beam, the second substrate is located on the input unit, the grating and the reflector, and forms a waveguide space with the first substrate; the adjustable reflecting unit is located outside of the waveguide unit, and is used for changing emitting angle and adjusting focus of the output beam.

10 Claims, 3 Drawing Sheets

OPTICAL WAVELENGTH DISPERSION

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention generally relates to a wavelength dispersion device, more particularly to an optical wavelength dispersion device capable of reducing the size and improving the degree of precise of the optical wavelength dispersion device.

Description of Related Arts

Conventional spectrometers generally use prism, grating or interference to realize dispersion effect, however, the overall size and the resolution ability of a spectrometer needs to be compromised with each other. Therefore, a conventional high resolution spectrometer is more expensive due to the sizable and complicated optical system.

In order to reduce the size of a spectrometer, LIGA (stands for Lithography, Electroplating, and Molding) is applied, which is a micro-manufacturing program combining lithography, electroplating, and molding, so as to enable a microstructure to have higher degree of precision during manufacturing, moreover, to produce a micro-structure having a height between hundreds and thousands of micrometer. Due to the structure of grating which needs to have small spacing, the yield of LIGA during the molding process and the degree of precision are insufficient for manufacturing vertical grating.

Furthermore, a light focus shift of the wavelength dispersion device due to parameter setup during the process of manufacture will decrease the degree of precision of the wavelength dispersion device. Hence, how to realize an optical wavelength dispersion device that is capable of reducing the size and improving the degree of precise is certainly a meaningful issue to resolve.

SUMMARY OF THE PRESENT INVENTION

An object of the present invention is to disclose a wavelength dispersion device, which aim to serve a purpose of reducing the size and improving the degree of precise of the optical wavelength dispersion device.

In order to achieve the objective of the present invention, an optical wavelength dispersion device is provided, which comprises:

a waveguide unit, which has a first substrate, an input unit, a grating, a reflector and a second substrate. The input unit is formed on the first substrate and having a slit for receiving an optical signal, the grating is formed on the first substrate for producing an output beam once the optical signal is dispersed, the reflector is located on the first substrate and is used for reflecting the output beam, and the second substrate, which is located on the input unit, the grating and the reflector, and forms a waveguide space with the first substrate; and an adjustable reflecting unit, which is located outside of the wavelength unit, being used for changing emitting angle and adjusting focus of the output beam.

According to one embodiment of the present invention, the input unit, the grating and the reflector are formed by exposing a photoresist layer through a high energy light source, and the high energy light source has its wavelength ranging from 0.01 nm to 100 nm.

According to one embodiment of the present invention, the grating has a concave, convex or planar profile, and with a surface appearing in a continuous laminar type, a sawtooth type, a blaze type, a sinusoidal type, or a combination of the above.

According to one embodiment of the present invention, the waveguide unit and the adjustable reflecting unit are wrapped by an outer casing.

According to one embodiment of the present invention, the bottom of the outer casing is arranged with a sliding groove, which a sliding member is located and capable of sliding therein, and the adjustable reflecting unit is connected with the sliding member for adjusting focus of the output beam.

In order to achieve the objective of the present invention, an optical wavelength dispersion device is also provided, which comprises:

a waveguide unit, which has a first substrate, an input unit, a grating, a second substrate and a reflector. The input unit is formed on the first substrate and having a slit for receiving an optical signal, the grating is formed on the first substrate for producing an output beam once the optical signal is dispersed, the second substrate, which is located on the input unit, the grating and the reflector, and forms a waveguide space with the first substrate, and the reflector is located outside of the waveguide unit for reflecting the output beam; and an adjustable reflecting unit, which is located outside of the waveguide unit, being used for changing emitting angle and adjusting focus of the output beam.

According to one embodiment of the present invention, the input unit and the grating are formed by exposing a photoresist layer through a high energy light source, and the high energy light source has its wavelength ranging from 0.01 nm to 100 nm.

According to one embodiment of the present invention, the grating has a concave, convex or planar profile, and with a surface appearing in a continuous laminar type, a sawtooth type, a blaze type, a sinusoidal type, or a combination of the above.

According to one embodiment of the present invention, the waveguide unit and the adjustable reflecting unit are wrapped by an outer casing.

According to one embodiment of the present invention, the bottom of the outer casing is arranged with a sliding groove, which a sliding member is located and capable of sliding therein, and the adjustable reflecting unit is connected with the sliding member for adjusting focus of the output beam.

BRIEF DESCRIPTION OF THE DRAWINGS

These and other objects and advantages of the present invention will become apparent from the following description of the accompanying drawings, which disclose several embodiments of the present invention. It is to be understood that the drawings are to be used for purposes of illustration only, and not as a definition of the invention.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

For those skilled in the art, it is understood that terms disclosed in the present invention, such as "horizontal", "vertical", "up", "down", "front", "rear", "left", "right", "upright", "level", "top", "bottom", "inside", "outside", and etc., are to indicate the directional position or location based on the disclosed figures, which are merely used to describe the present invention and simplify the description without indicating or implying a specific position or location of an apparatus or component, or a specific positional structure or operation. Therefore, the terms are not to be understood as limitations to the present invention.

It is understandable that, "one" is interpreted as "at least one" or "one or more than one", even though one embodiment disclosed in the present invention uses "one" indicating the number of a component is one, it is possible for another embodiment to have "at least one" or "one or more than one" for the number of a component. Therefore, "one" is not to be interpreted as a limitation for number.

Although some words has been used in the specification and subsequent claims to refer to particular components, person having ordinary skill in the art will appreciates that manufacturers may use different terms to refer to a component. The specification and claims are not to be differences in the names as a way to distinguish between the components, but with differences in the function of the component as a criterion to distinguish. As mentioned throughout the specification and claims, in which the "include, has, comprise, and with" are an open-ended term, they should be interpreted as "including but not limited to".

Figure 1:
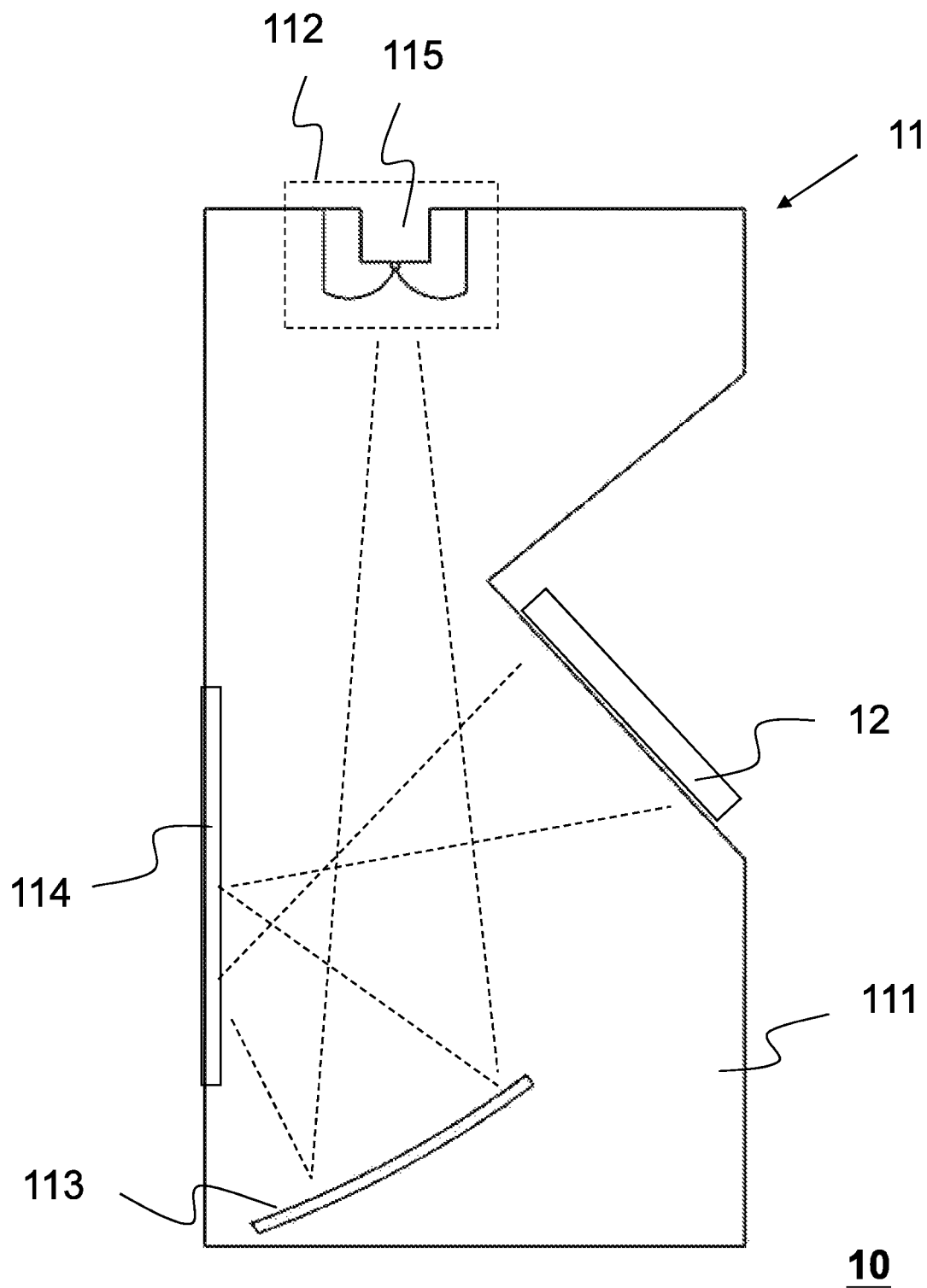
FIG. 1 illustrates a preferred embodiment of the disclosed optical wavelength dispersion device.

FIG. 1 illustrates one preferred embodiment for the optical wavelength dispersion device disclosed in the present invention, which shows: an optical wavelength dispersion device 10 is made of a waveguide unit 11 and an adjustable reflecting unit 12. The waveguide unit 11 and the adjustable reflecting unit 12 are wrapped by an outer casing 13 and a covering plate 14. The waveguide unit 11 includes a first substrate 111, an input unit 112, a grating 113, a reflector 114 and a second substrate 116; the input unit 112 is formed on the first substrate 111 and having a slit 115 for receiving an optical signal, wherein the slit 115 has a width ranged between 5 µm and 500 µm; the grating 113 is formed on the first substrate 111, which generates and outputs a first beam (defocused and focused beam) based on the optical signal, thereby conducting dispersion, and having the incident arranged at the reflector 114 on the first substrate. In addition, the input unit 112, the grating 113 and the reflector 114 are formed by exposing a photoresist layer under a high energy light source on the first substrate. The high energy light source may be selected from any of X-ray, soft X-ray or extreme ultraviolet (EUV), wherein the X-ray has its wavelength ranging from 0.01 nm to 1 nm; the soft X-ray has its wavelength ranging from 0.1 nm to 10 nm; and the EUV has its wavelength ranging from 10 nm to 120 nm. The first substrate 111 and the second substrate 116 may be selected from any of semiconductor substrates, glass substrates, metal substrates or plastic substrates. Notably, due to the surface roughness limitation in optical telecommunications and local optical communications, the wavelength with 0.1 nm to 1 nm of the high energy light source is better than that with 1 nm to 100 nm, and the photoresist layer is made of SU-8 or PMMA.

As disclosed above, the grating 113 has a concave, convex or planar profile, and with a surface appearing in a continuous laminar type, a saw-tooth type, a blaze type, a sinusoidal type, or a combination of the above. Generally speaking, the grating 113 is used for increasing the diffraction efficiency of specified diffraction hierarchy, and an appropriate wavelength of the optical signal is from 200 nm to 2000 nm.

Owing to a fact that the total route for the optical signal to enter into the waveguide unit 11 from the slit 115 and finally to be outputted is fixed after a carefully calculation, an excessive or insufficient route will make impact on optical aberration, therefore, the design of the reflector 114 in the aforementioned embodiment is able to enable the first beam to conduct a second reflection on the waveguide unit 11, thereby reducing the size of the wavelength dispersion device under the premise that the waveguide unit 11 has the same optical path route.

Figure 2:
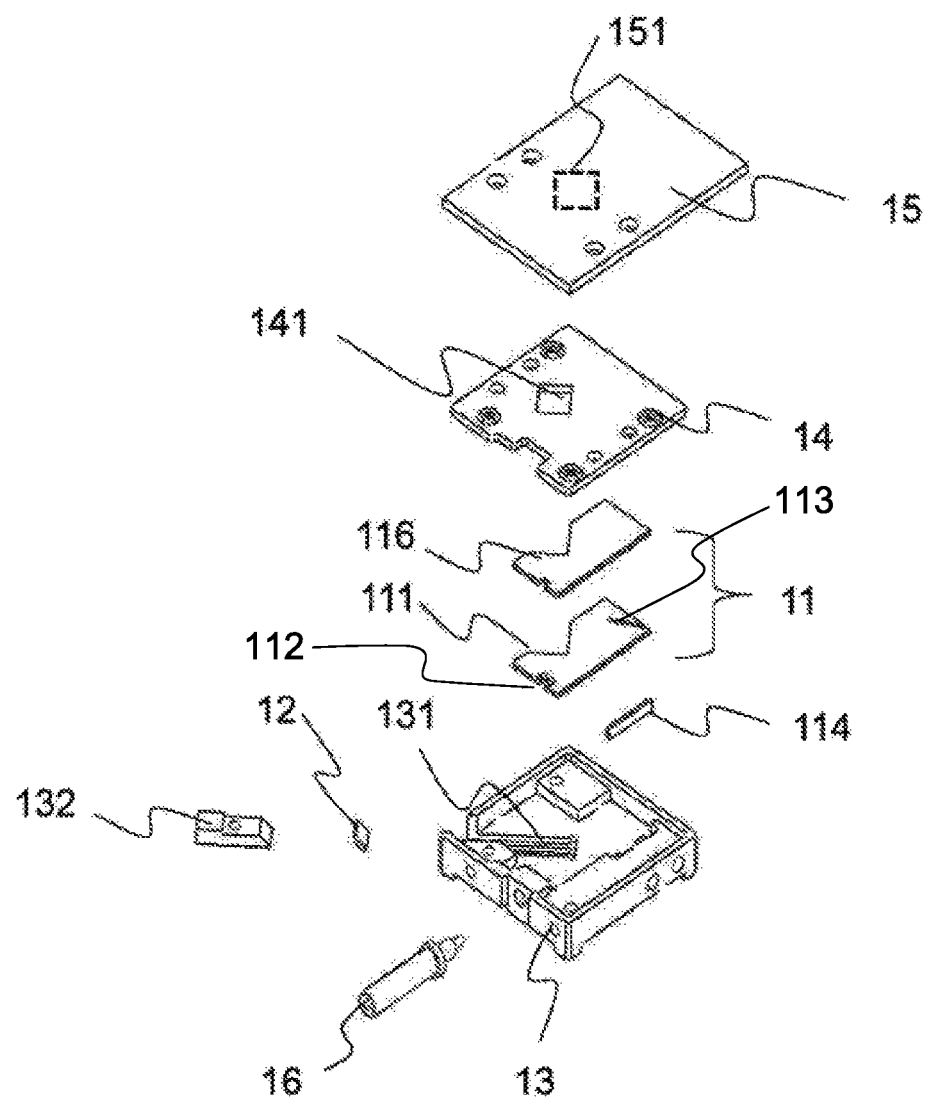
FIG. 2 illustrates an explosion drawing of another preferred embodiment of the disclosed optical wavelength dispersion device.
Figure 3:
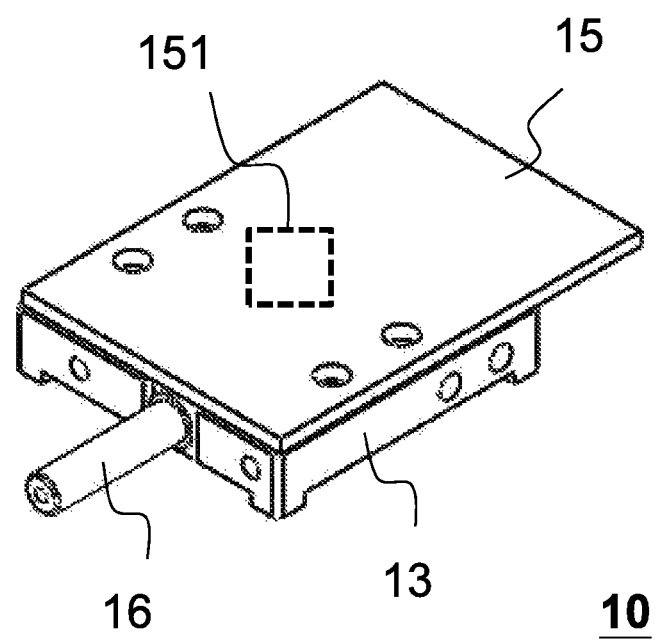
FIG. 3 illustrates an integrated drawing of the preferred embodiment above of the disclosed optical wavelength dispersion device.

FIG. 2 and FIG. 3 illustrate another embodiment wavelength dispersion device disclosed in the present invention, which show: the reflector 114 of the wavelength dispersion device, wherein the reflector 114 is located outside of the waveguide unit 11 for reflection the output beam; and another adjustable reflecting unit 12 being used for outputting the first beam (defocused and focused beam) from the reflector 114, and changing emitting angle of the first beam. Additionally, an image sensor 151 is able to receive the first beam from the adjustable reflecting unit 12 for subsequent processes.

Following the aforementioned as shown in FIG. 2, the second substrate 116 covers the input unit 112, the grating 113 and the reflector 114, therefore, the first substrate 111 and the second substrate 116 form a space which can be viewed as a waveguide unit 11 and is used for receiving and transmitting optical signals.

Furthermore, based on the aforementioned embodiment, the input unit 112 and the grating 113 are formed by exposing a photoresist layer under a high energy light source on the first substrate 111. The high energy light source may be selected from any of X-ray, soft X-ray or extreme ultraviolet (EUV), wherein the X-ray has its wavelength ranging from 0.01 nm to 1 nm; the soft X-ray has its wavelength ranging from 0.1 nm to 10 nm; the EUV has its wavelength ranging from 10 nm to 120 nm.

The first substrate 111 and the second substrate 116 may be selected from any of semiconductor substrates, glass substrates, metal substrates or plastic substrates. Notably, due to the surface roughness limitation in optical telecommunications and local optical communications, the wavelength with 0.1 nm to 1 nm of the high energy light source is better than that with 1 nm to 100 nm, and the photoresist layer is made of SU-8 or PMMA.

Due to the adjustable reflecting unit 12 is used for outputting the first beam from the reflector 114 as disclosed in the aforementioned embodiment, hence, the image sensor 151 can be placed in any direction and location (particularly above or below) of the optical wavelength dispersion device 10 based on user's requirements, thereby reducing the overall size.

Additionally, as shown in FIGS. 2 and 3, since the adjustable reflector 12 changes emitting angle of the first beam, the covering plate 14 is arranged with an opening 141 with respect to the reflector 12, thereby enabling the first beam to output. In the preferred embodiment of the present invention, the covering plate 14 is allocated with an IC carrier 15, and the image sensor 151 is arranged on the IC carrier 15 in corresponding to the position of the opening 141, so as to receive the first beam for subsequent analyses. Consequently, a combination of the image sensor 151 and the disclosed optical wavelength dispersion device reduces further the size of overall system.

Furthermore, as shown in FIG. 2, the outer casing 13 is arranged with a sliding groove 131 at the bottom, wherein a sliding member 132 is located so as to slide inside the sliding groove 131 as needed. The adjustable reflecting unit 12 is connected with the sliding member 132 for adjusting focus of the output beam. That is, when the first beam is out-of-focus outputted, the user is able to adjust the position of the adjustable reflecting unit 12 through the sliding member 132, thereby changing the distance of an overall optical route in order to adjust the focus of the output beam.

Finally, as shown in FIG. 3, the optical wavelength dispersion device 10 further includes a configuration that wraps up the waveguide unit 11 and the reflector 12 by using an outer casing 13 and a covering plate 14. Having protected by the outer casing 13 and the covering plate 14, the waveguide unit 11 and the reflector 12 avoid direct contact with external force, thereby maintaining stability of the overall structure. When optical signal enters into the waveguide unit 11 through the slit 115 of the input unit 16 (usually an optical fiber cable), the process of dispersion begins.

There have thus been shown and described an optical wavelength dispersion device. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention.

Although some words has been used in the specification and subsequent claims to refer to particular components, person having ordinary skill in the art will appreciates that manufacturers may use different terms to refer to a component. The specification and claims are not to be differences in the names as a way to distinguish between the components, but with differences in the function of the component as a criterion to distinguish.

Preferred embodiments are provided only as examples without limiting the scope of the present invention, and modifications will be apparent to those skilled in the art. The purpose of the present invention has been completed and served effectively. The functions and general principles defined in the present invention would be applied to other embodiments, alternatives, modifications, equivalents, and applications without departing from the spirit and scope of the present invention.

What is claimed is:

1. An optical wavelength dispersion device, comprising:
a waveguide unit, wherein the waveguide unit includes:
a first substrate;
an input unit, which is formed on the first substrate and having a slit for receiving an optical signal;
a grating, which is formed on the first substrate, capable of producing an output beam once the optical signal has been dispersed;
a reflector, which is formed on the first substrate, being used for reflecting the output beam; and
a second substrate, which is located on the input unit, the grating and the reflector, forming a waveguide space with the first substrate; and
an adjustable reflecting unit, wherein when the slit of the input unit receives the optical signal, the optical signal then reaches to the grating and a dispersion process is conducted by the grating for generating the output beam, and the output beam projecting to the reflector is reflected toward the adjustable reflecting unit by the reflector, wherein the adjustable reflecting unit is located outside of and attached to the waveguide unit for changing emitting angle and adjusting focus of the output beam.

2. The optical wavelength dispersion device of claim 1, wherein the input unit, the grating and the reflector are formed by exposing a photoresist layer under a high energy light source, which the high energy light source has its wavelength ranging from 0.01 nm to 100 nm.

3. The optical wavelength dispersion device of claim 1, wherein the grating has a concave, convex or planar profile, and with a surface appearing in a continuous laminar type, a saw-tooth type, a blaze type, a sinusoidal type, or a combination of the above.

4. The optical wavelength dispersion device of claim 1, wherein the waveguide unit and the adjustable reflecting unit are wrapped by an outer casing.

5. The optical wavelength dispersion device of claim 4, wherein the bottom of the outer casing is arranged with a sliding groove, which a sliding member is located and capable of sliding therein, and the adjustable reflecting unit is connected with the sliding member for adjusting focus of the output beam.

6. An optical wavelength dispersion device, comprising:
a waveguide unit, wherein the waveguide unit includes:
a first substrate;
an input unit, which is formed on the first substrate and having a slit for receiving an optical signal;
a grating, which is formed on the first substrate, capable of producing an output beam once the optical signal has been dispersed;
a reflector, which is located outside of the waveguide unit, being used for reflecting the output beam;
a second substrate, which is located on the input unit, the grating and the reflector, forming a waveguide space with the first substrate; and
an adjustable reflecting unit, which is located outside of and attached to the waveguide unit, being used for changing emitting angle and adjusting focus of the output beam.

7. The optical wavelength dispersion device of claim 6, wherein the input unit and the grating are formed by exposing a photoresist layer under a high energy light source, which the high energy light source has its wavelength ranging from 0.01 nm to 100 nm.

8. The optical wavelength dispersion device of claim 6, wherein the grating has a concave, convex or planar profile, and with a surface appearing in a continuous laminar type, a saw-tooth type, a blaze type, a sinusoidal type, or a combination of the above.

9. The optical wavelength dispersion device of claim 6, wherein the waveguide unit and the adjustable reflecting unit are wrapped by an outer casing.

10. The optical wavelength dispersion device of claim 9, wherein the bottom of the outer casing is arranged with a sliding groove, which a sliding member is located and capable of sliding therein, and the adjustable reflecting unit is connected with the sliding member for adjusting focus of the output beam.

* * * * *